United States Patent
Bromberg et al.

(10) Patent No.: US 7,703,446 B2
(45) Date of Patent: Apr. 27, 2010

(54) SINGLE NOZZLE DIRECT INJECTION SYSTEM FOR RAPIDLY VARIABLE GASOLINE/ANTI-KNOCK AGENTS MIXTURES

(75) Inventors: Leslie Bromberg, Sharon, MA (US); Paul Blumberg, Southfield, MI (US); Daniel R. Cohn, Cambridge, MA (US); John Heywood, Newtonville, MA (US)

(73) Assignee: Ethanol Boosting Systems LLC, Cambridge, MA (US)

( * ) Notice: Subject to any disclaimer, the term of this patent is extended or adjusted under 35 U.S.C. 154(b) by 90 days.

(21) Appl. No.: 11/782,050

(22) Filed: Jul. 24, 2007

(65) Prior Publication Data

US 2008/0156303 A1  Jul. 3, 2008

Related U.S. Application Data

(63) Continuation-in-part of application No. 11/682,372, filed on Mar. 6, 2007.

(60) Provisional application No. 60/832,836, filed on Jul. 24, 2006.

(51) Int. Cl.
*F02B 13/00* (2006.01)
*F02M 25/14* (2006.01)

(52) U.S. Cl. .................................................. 123/575

(58) Field of Classification Search ................ 123/575, 123/515, 406.11, 531, 297; 701/101, 103, 701/104

See application file for complete search history.

(56) References Cited

U.S. PATENT DOCUMENTS 5,282,451 A * 2/1994 Yoshida et al. .......... 123/406.15
5,560,344 A * 10/1996 Chan ........................... 123/515
5,884,597 A * 3/1999 Hiraku et al. ........... 123/179.17
6,672,290 B2 * 1/2004 Ricco ........................... 123/514
6,681,743 B2 * 1/2004 de Ojeda ..................... 123/446
6,931,840 B2 * 8/2005 Strayer et al. .................. 60/285
7,069,720 B2 * 7/2006 Strayer et al. .................. 60/285
7,225,787 B2 * 6/2007 Bromberg et al. ........ 123/198 A
7,251,556 B2 * 7/2007 Kaneko et al. ............... 701/111
7,357,101 B2 * 4/2008 Boyarski ..................... 123/1 A
7,395,786 B2 * 7/2008 Leone et al. ................. 123/1 A
2002/0092503 A1 * 7/2002 Ricco ........................... 123/446
2002/0139321 A1 * 10/2002 Weissman et al. ........... 123/1 A
2005/0056264 A1 * 3/2005 Weissman et al. ........... 123/577
2006/0102136 A1 * 5/2006 Bromberg et al. ........ 123/198 A
2007/0119416 A1 * 5/2007 Boyarski ..................... 123/304
2007/0119424 A1 * 5/2007 Leone et al. ................. 123/461
2007/0219674 A1 * 9/2007 Leone ............................ 701/1
2008/0168966 A1 * 7/2008 Bromberg et al. ........... 123/528

* cited by examiner

*Primary Examiner*—Stephen K Cronin
*Assistant Examiner*—Arnold Castro
(74) *Attorney, Agent, or Firm*—Nields, Lemack & Frame, LLC

(57) ABSTRACT

Engine management system for operation of a direct injection spark ignition gasoline engine. The system includes a gasoline engine, a source of gasoline and a source of an anti-knock agent. Gasoline and anti-knock agent are introduced into a proportioning valve that delivers a selected mixture of gasoline/anti-knock agent to a high pressure pump. At least one injector receives the selected mixture from the high pressure pump and delivers the mixture into a cylinder of the engine. The engine management system provides a rapidly variable mixture of directly injected anti-knock agent and gasoline which prevents knock as the engine torque increases.

33 Claims, 1 Drawing Sheet

SINGLE NOZZLE DIRECT INJECTION SYSTEM FOR RAPIDLY VARIABLE GASOLINE/ANTI-KNOCK AGENTS MIXTURES

This application is a continuation-in-part of U.S. application Ser. No. 11/682,372 filed Mar. 6, 2007. This application also claims priority to U.S. Provisional Application Ser. No. 60/832,836 filed Jul. 24, 2006. The contents of these two applications are incorporated herein by reference.

BACKGROUND OF THE INVENTION

This invention relates to engine management systems and more particularly to a fuel management system that uses a single nozzle direct injection system for directly injecting a rapidly variable ratio of an anti-knock agent and gasoline into a cylinder in order to prevent knock as the engine torque is increased. The anti-knock agents that can be used include ethanol and methanol.

On demand use of directly injected (DI) ethanol or other anti-knock agents in spark ignition engines that also employ gasoline direct injection is very attractive as a means to control knock and enable operation of the engine at much higher levels of torque/horsepower. Computer model calculations have shown that relative to port injection of gasoline and direct injection of the anti-knock agent, the direct injection of gasoline as well as the anti-knock agent can significantly reduce the amount of anti-knock agent required over a drive cycle. Typically, multiple sets of injectors would be required for separate injection of gasoline and an anti-knock agent. However, the use of multiple sets of injectors may be prohibited by available cylinder head space, is complex and therefore expensive.

In order to address the drawbacks of multiple injectors, the use of a single nozzle configuration is discussed in U.S. Pat. No. 7,225,787, the contents of which are incorporated herein by reference. This patent does not discuss, however, how to mix the gasoline and anti-knock agent outside of the injector, and in particular, that patent does not disclose means for mixing the gasoline and the anti-knock agent so as to minimize the cost of the system through the use of a single high pressure pump. It also does not discuss means to insure that adequate knock suppression will be provided during transient conditions as the engine torque increases. Because of the finite volume between a proportioning valve and the injector, and the finite rate of fuel consumption, there is a natural delay in adjusting the anti-knock agent to gasoline ratio that is injected into the cylinder. This delay, referred to as a "fuel composition adjustment delay", can result in knocking conditions when the engine operation changes from low torque to high torque. The reverse situation, when the engine operation changes from high torque to low torque does not result in increased tendency to knock and the fuel composition adjustment delay results only in slightly increased anti-knock agent utilization.

An object of the present invention is a fuel management system for operation of a direct injection spark ignition gasoline engine that eliminates the need for multiple injector sets when direct injection of an anti-knock agent is employed to prevent knock as the engine torque increases.

SUMMARY OF THE INVENTION

In a first aspect, the invention is an engine management system for operation of a direct injection spark ignition gasoline engine including a gasoline engine, a source of gasoline, and a source of anti-knock agent which is directly injected through the same nozzle as the gasoline. First and second low pressure pumps pump gasoline and anti-knock agent into a proportioning valve. The proportioning valve receives the gasoline and anti-knock agent and delivers a selected mixture of gasoline/anti-knock agent to a high pressure pump. At least one injector receives the selected mixture from the high pressure pump and delivers the mixture into a cylinder of the engine. In a preferred embodiment, the proportioning valve is driven by an actuator to control the ratio of gasoline to anti-knock agent in the mixture. The actuator may use rotation or translation to select the proportions of the mixture. Preferred anti-knock agents are ethanol and methanol. The anti-knock agent may also contain a substantial fraction of ethanol such as E85, which contains around 80% by volume of ethanol. It is preferred that ethanol forms a substantial fraction, on the order of 50% or greater, of the anti-knock agent mixture.

In another preferred embodiment, the system is designed with decreased volumes downstream from the proportioning valve so that the mixture may be varied rapidly. The high pressure pump and proportioning valve may form a single unit and the fuel management system may include a common rail fuel system. It is preferred that a controller use pulse width modulation (PWM) to control a single set of DI injectors. Pulse width modulation provides a stable means of controlling direct injection while maintaining a large dynamic range.

In one aspect of the invention, adequate knock prevention during the fuel-composition adjustment delay period is provided by an expert system in which a microprocessor is programmed to anticipate the need for direct anti-knock agent injection, and which would provide additional anti-knock agent or fill the injector with fuel with a high concentration of anti-knock agent. Spark retard or increased spark retard may also be used to prevent knock during the fuel-composition adjustment delay period.

In another aspect, the invention is an engine management system for operation of a spark ignition gasoline engine in which first and second low pressure pumps pump gasoline and anti-knock agent into a high pressure pump. The high pressure pump receives the gasoline and anti-knock agent and pressurizes them separately. A proportioning valve receives the pressurized gasoline and anti-knock agent and delivers a selected mixture of gasoline and anti-knock agent to at least one injector for injection into a cylinder of the engine. In a preferred embodiment of this aspect of the invention, the high pressure pump pressurizes the gasoline and anti-knock agent using a single pump shaft.

DESCRIPTION OF THE PREFERRED EMBODIMENT

Figure 1:
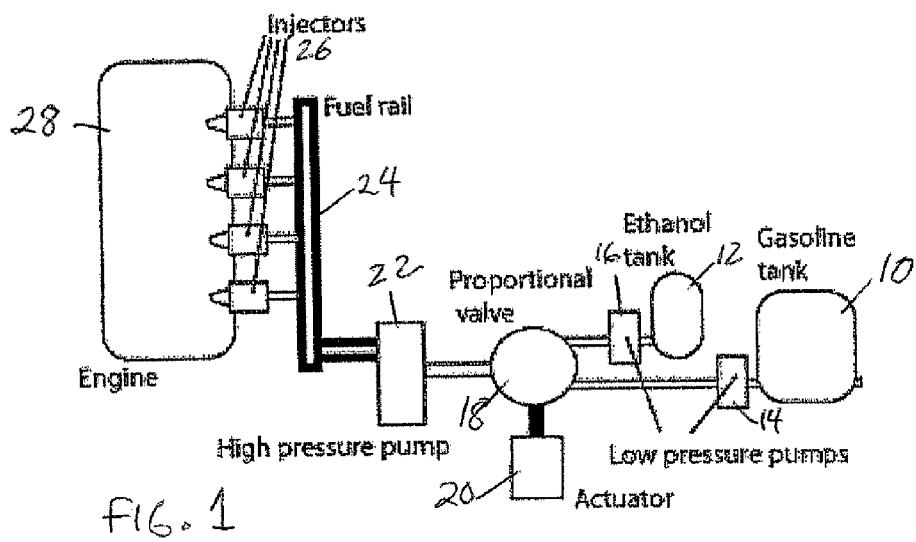
FIG. 1 is a cross-sectional view of an embodiment of the invention.

With reference first to FIG. 1, a gasoline tank 10 and anti-knock agent tank 12 provide gasoline and anti-knock agent such as ethanol and are pumped by first and second low pressure pumps 14 and 16 into a proportioning valve 18. The proportioning valve 18 is operated by an actuator 20. The proportioning valve 18 delivers a selected gasoline/antiknock agent mixture to a single high pressure pump 22. The high pressure pump 22 delivers the mixture in this embodiment to a fuel rail 24 that distributes the mixture to injectors 26. The injectors inject the mixture into a cylinder of an engine 28.

The proportioning valve 18 therefore receives ethanol, for example, from the anti-knock agent tank 12 and gasoline from the gasoline tank 10 and controls the ethanol/gasoline ratio that is fed to the direct injection injectors 26. The total gasoline and ethanol mixture is controlled by the use of pulse width modulation of the injectors 26 while the gasoline-antiknock agent ratio is controlled by the proportioning valve 18. Pulse width modulation has been used in prior art gasoline direct injection (GDI) and port fuel injection (PFI). The proportioning valve 18 is connected to the actuator 20 that automatically decreases one fluid stream and increases the other.

Figure 2:
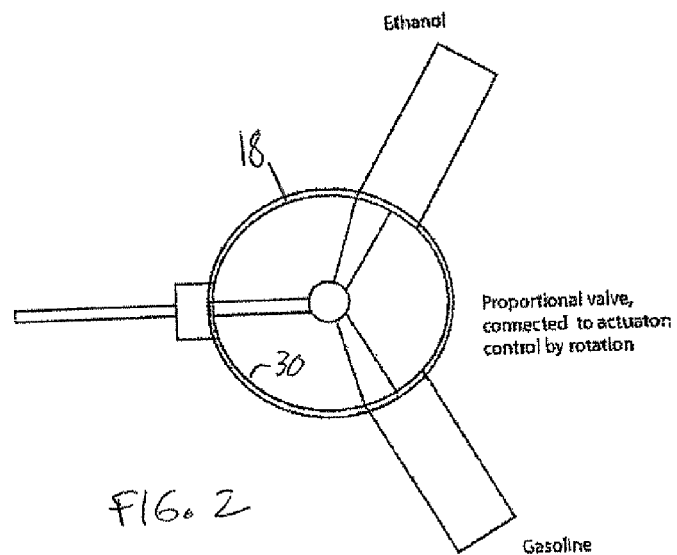
FIG. 2 is a cross-sectional view of an embodiment of a proportioning valve used in the invention.

An embodiment of a suitable proportioning valve 18 is shown in FIG. 2. The ratio of gasoline to ethanol is controlled by rotation of an inner drum 30 that adjusts fluid flow from the gasoline tank 10 and ethanol tank 12.

One difficulty that the configuration of FIG. 1 addresses is the problem of ethanol running out and the DI injectors fouling. Injection through the DI injectors 26 may be necessary even when ethanol is not needed to prevent knock so as to prevent temperature and/or deposit damage to an injector 26 or improper function due to improper spray characteristics from the injector nozzles. If the injector 26 uses only ethanol, it may not be possible to operate the engine after the ethanol use is exhausted or terminated as the injectors might then be damaged or function improperly.

In the configuration shown in FIG. 1, when ethanol use is exhausted or terminated, the proportioning valve 18 injects only gasoline. Similarly, when the gasoline use is exhausted or terminated, the proportioning valve 18 injects only ethanol. The system disclosed herein can be used to provide either gasoline, ethanol or a mix of gasoline and ethanol during substantially all of the time the engine is operated. Because the injectors 26 are always injecting some fluid, whether gasoline or ethanol, the injectors 26 are less likely to become fouled and inoperative.

The embodiment shown in FIG. 1 requires injectors 26 with greater capacity and a 30%-40% larger dynamic range because the flow through them varies more than with conventional GDI (the required ethanol flow is larger than that of gasoline for comparable engine power because of the lower volumetric heat of combustion of ethanol).

In addition to the use of PWM for controlling the fuel flow rate, it is also possible to vary pump pressure and, thereby, fuel-rail pressure to partially or completely address the requirements of large dynamic range of the injector 26. In the embodiment of FIG. 1, note that the proportioning valve 18 is upstream from the single high pressure pump 22. Only one high pressure pump is required. The ethanol and gasoline are pumped out of their respective reservoirs with simple, low pressure pumps 14 and 16.

An issue with the configuration of FIG. 1 is that the arrangement results in decreased time response of the anti-knock agent/gasoline fraction of the mixture because of the fuel-composition adjustment delay, since the mixture after the proportioning valve 18, including the high pressure pump 22 and the fuel rail 24, needs to be consumed before there can be a change in the ethanol/gasoline ratio of the mixture. Thus, to achieve the desired knock control with minimal ethanol usage, it is necessary to have a system that minimizes the volume between the proportioning valve 18, the high pressure fuel pump 22 and the fuel rail 24. In conventional DI systems, the time lag is about one second at relatively high power (which results in large fuel consumption rate and thus minimizes the fuel-composition adjustment delay). The lag time is determined by the ratio of the volume of fluid in the injectors 26, the fuel rail 24 and in the high pressure pump 22, and the volumetric flow rate of the mixture. Reduced times are possible through careful design of the injector system having a decreased volume, and in particular, minimizing the size of the common rail system and locating the high pressure pump close to the common rail.

The tendency of an engine to knock while in transition from low to high torque is delayed. The delay is due in part to the fact that initially after the transition, the cylinder walls and the residual gas are colder (from the lower torque operation), thereby minimizing knocking in the early stages of the transition to high torque. Therefore, any delay in adjustment of the fuel mix into the cylinder (due to the fuel-composition adjustment delay) is partially offset by the delay of the onset of knocking conditions in the engine due to the thermal inertia of the top end of the engine structure.

If the delay in knock onset during the transient due to the effect of thermal inertia is insufficient, an active means to avoid knock during transients or during the fuel-composition adjustment delay period when the fuel system is loaded with lower fractions of anti-knock agent than required for avoiding knock, is to operate the system for short periods of time during the transition from low torque to high torque under fuel rich conditions. It has also been determined that operation with fuel lean conditions, at constant BMEP, can also be used to minimize knock during the fuel-composition adjustment delay period. Spark timing can also be retarded in each cylinder on a cyclically instantaneous basis according to a prescribed schedule during the fuel transition in the injection system. This may involve either retarding the spark timing from a condition of no spark retard or increasing it from what it would have otherwise been in the absence of transients. The amount of spark retard in the absence of transients may be zero, a constant value or varied according to the speed/load conditions in order to minimize the use of the anti-knock agent. A combination of fuel rich operation as well as spark retard or increased spark retard can be used under some transient conditions including during the fuel-composition adjustment delay period. Alternatively, fuel leaning could also be used during the fuel-composition adjustment period.

Fuel enrichment, or fuel leaning, should be possible without substantial effect on emissions. As fuel enrichment or fuel leaning doesn't begin at very low brake mean effective pressure (BMEP) and is not used extensively (only until the required anti-knock agent/gasoline fraction in the DI injector is reached after the fuel-adjustment delay period) and three-way catalysts have limited oxygen storage capability it should not cause an emissions problem. The fuel management system adjusts the amount of enrichment or the amount of leaning in the air/fuel ratio by taking into consideration the known ethanol/gasoline composition of the fuel in the fuel line, and the conditions in the cylinder, including torque, engine speed, spark timing, and other environmental conditions (such as air temperature) to decide upon the required enrichment to prevent knock. The fuel management system can also use knock sensors to control the level of turbocharging, the amount of spark retard and the amount of fuel enrichment or fuel leaning that prevents knock, adjusting any/or all of these factors until the engine is using the desired anti-knock agent/gasoline fraction. The amount of enrichment combined with spark retard can be limited by the use of a look-up table, and can be limited by instantaneous and/or integrated hydrocarbon emissions and combustion stability.

The effects of spark retard and air/fuel adjustment can be substantial in avoiding knock. At 2000 rpm engine speed and conditions of relatively high BMEP, our computer model has determined that spark retard can be used to decrease the ethanol/gasoline ratio by about 0.15 fractional units, while fuel rich operation (to equivalent ratio of 1.2) can be used to decrease the ethanol/gasoline ratio by about 0.1 fractional units, for a combined effect of about 0.25 fractional units (nearly additive). This is a substantial effect that can be very effective in avoiding most of the knock tendency during the fuel-composition adjustment delay period.

Lean fuel/air mixtures operation requires higher pressures (for constant BMEP), and thus increased boosting over that which would be required by stoichiometric operation (if knock could be avoided). However, our models indicate that the required ethanol/gasoline fraction can be decreased, as the knocking tendency of reduced temperature from the combustion is decreased more than the knocking tendency is increased by the effect of increased pressure. For example, with a compression ratio of 13, operating at 21 bar BMEP at 1500 rpm, the ethanol energy fraction can be decreased by 0.04 fractional units for a change of equivalence ratio from 1 to 0.9, similar rate of change than the fractional change in ethanol energy fraction due to rich operation.

One option during the fuel-composition adjustment delay period is to operate some of the cylinders rich (avoiding knock in this manner), while simultaneously operating some of them lean (avoiding knock in this manner). Knock tendency, at constant BMEP, peaks near stoichiometric conditions, and decreases on both sides of stoichiometry. The overall air/fuel ratio, as seen by the catalyst, could be near stoichiometric if desired. In addition, it is possible to vary which cylinders that are running rich and lean, in such a way as to provide an adjustment to the gas walls and the residuals to try to control knock. In this manner a given cylinder could operate rich during a portion of the fuel composition adjustment delay, while operating lean during other portion of the fuel composition adjustment delay.

The proportioning valve 18 can be incorporated into the high pressure pump 22 if desired. In this case, the mixed fuel used for pump cooling cannot be returned to the tank. Thus, fuel recirculation for pump cooling needs to be done with the low pressure side of the fuel, either with gasoline, ethanol, or with both fluids, prior to mixing.

The high pressure system disclosed herein can be a common rail fuel system embodiment. The high pressure fuel line is pressurized from the pump with injection timing and injected amount controlled by injector opening.

Although ethanol is a preferred anti-knock agent, any mix that contains a substantial fraction of ethanol may be used. Fuels such as E85, having an ethanol content typically between 78% to 80% by volume, with the rest being gasoline, can be used with little adverse impact on the anti-knock characteristics of the additive. Other fuels containing ethanol can also be used, with little impact as long as the ethanol fraction in the fuel is on the order of 50% or greater. In addition, an ethanol/water mixture can be used.

A second preferred anti-knock additive that can be used is methanol or mixtures including methanol. Methanol has increased evaporative cooling properties as compared with ethanol and thus can be used as an anti-knock agent, premixed with conventional gasoline in the proportional valve 18 upstream from the single high pressure pump 22. The pump 22, the proportioning valve 18, the fuel rail 24 and the injectors 26 need to be less corrosion resistant than in the case when the injector is exclusively injecting anti-knock fuel (either ethanol or methanol based). The corrosion requirements of the injectors are relaxed because pure methanol or a methanol mixture is used only sporadically, with the direct injector operating most of the time with straight gasoline, and seldom with gasoline/methanol additive mixtures.

A major advantage of the single nozzle invention disclosed herein is that because both gasoline and ethanol/ethanol mixtures/methanol/methanol mixtures go through the same injector, injector lubrication issues are minimized, as the gasoline provides sufficient lubrication as the engine rarely, and then only for short periods, operates at high concentration of ethanol/ethanol mixtures/methanol/methanol mixtures.

There is a difficulty when a single injector is used to inject two fuels since the mixing occurs upstream from the injector causing a delay associated with the finite volume of the fuel line from the point where the fuels are mixed to the injector. As mentioned above, one way to address this problem is by minimizing the volume. A second way is to return the fuel from the pressurized line to the fuel tank when an increase in the fraction of the ethanol/gasoline is desired as when going from low torque to high torque. It is possible to return the fuel in the common rail, in the pump and in the region between the proportioning valve and the pump to either the anti-knock fuel tank or to the gasoline tank in order to purge the fuel and achieve the desired ratio more quickly. In order not to dilute the ethanol fuel with gasoline from the fuel line, it is preferred to return the fuel to the gasoline tank. This technique is not needed during a transient from high torque to low torque as the engine is not likely to knock during this transient, and the delay in the adjustment results in the unnecessary consumption of only a small amount of ethanol (that which is in the volume between the mixing region and the injectors). The increase in ethanol consumption is very minimal.

Figure 3:
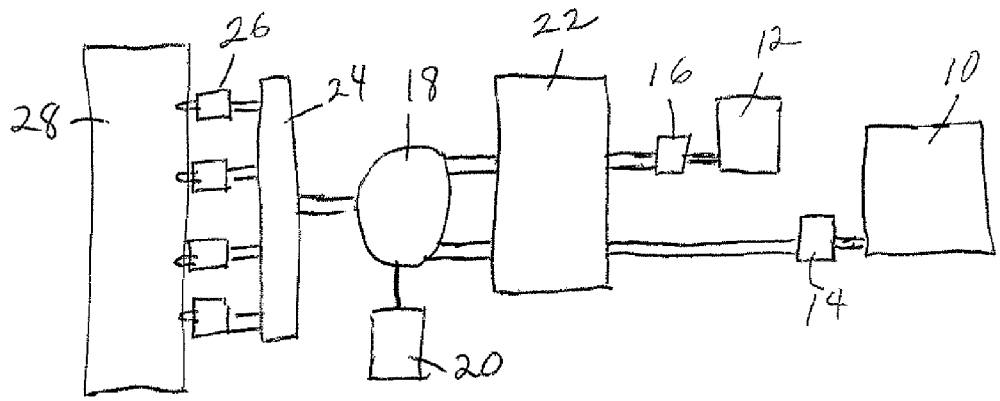
FIG. 3 is a cross-sectional view of another embodiment according to the invention

Another embodiment of the invention is shown in FIG. 3. In this embodiment, a single high pressure pump 22 receives gasoline from the low pressure pump 14 and anti-knock agent from the low pressure pump 16 and pressurizes the two fuels separately. It is preferred that the high pressure pump 22 pressurizes both fuels from a single shaft with mixing occurring downstream from the pump 22. The pressurized fluid streams are combined at a selected ratio in the proportioning valve 18. As in the embodiment illustrated in FIG. 1 in which mixing occurs upstream from the pump 22, mixing needs to be performed by the proportional valve 18 as conventional pulse width modulation valves cannot be employed.

In order to utilize pulse width modulation for control of the mix, it is necessary to have very high speed controllers. It is preferred that a primary injector control the amount of fuel into a cylinder, referred to as the primary PWM valve. Separate pulse width modulation of the ethanol and gasoline can be effective when the minimum time that gasoline and ethanol valves have pulse widths substantially smaller than that of the main injector. These injectors will be referred to as secondary PWM valves. Thus, by modulating the secondary PWM valves while the primary PWM valve is open, it is possible to vary the composition of the fuel. It should be noted that the secondary PWM valves operate at low pressures. Because of the fast speed required, piezoelectric valves are preferable.

Pulse pressure air assist injectors can also be used with secondary PWM valves to allow cycle-cycle control of the ethanol/gasoline fraction without delay. In this case, the secondary PWM valves do not have to operate at high pressure as is common with gasoline-direct-injected engines. An advantage of pulsed pressure air assist injectors is that the dynamic range of the injector can be substantially increased, while at the same time minimizing the injection time.

An embodiment of an injector with two valves and a single nozzle (mixing in the plenum upstream from the nozzle), or two valves and two nozzles has been described in U.S. Pat. No. 7,225,787 referred to above. That embodiment requires two common fuel rails, one for the gasoline and the second one for the anti-knock agent (ethanol or mixtures, or methanol or mixtures). The cost of such a system can be minimized if both pumps are driven by the same shaft, that is, the use of a single fuel pump that accommodates separately both fuels. One may also provide fuel to a single injector (with multiple nozzles and/or valves) through the use of parallel common rail fuel systems, one for the gasoline and one for the anti-knock agent. In such a system, ethanol can be used only as required and discontinued as soon as it is no longer required with no delay, thereby minimizing its use. It also serves the purpose of cooling the injector when only one fuel is flowing, thereby preventing damage to the injector or improper operation.

Another embodiment of the invention uses a single injector for direct injection of gasoline from a gasoline tank and ethanol from an ethanol tank in combination with port fuel injection of gasoline from the gasoline tank. During parts of the drive cycle during which the engine is operated at low levels of torque, the engine is operated only on port fuel injection gasoline and the direct injection system is primed with ethanol thus allowing a very rapid response when an engine transient demands increased ethanol. The objective of this configuration is to allow very rapid introduction of DI ethanol when it is first called for followed by direct injection of gasoline as well as ethanol over a longer time period. The direct injection of gasoline as well as ethanol reduces the amount of ethanol that is required. Computer models show that a large decrease in ethanol required over a drive cycle can be obtained by using direct injection of gasoline as well as direct injection of ethanol.

Because of the lack of space in the cylinder head for additional components, especially in the case of a cylinder of small displacement engines, the possibility of using a direct injector that also has a spark plug is very attractive. Such a configuration has been advanced for applications with gasoline direct injection. See, U.S. Pat. Nos. 5,497,744; 7,201,136; 7,086,376; 7,077,100; 6,955,154; 6,755,175; 6,748,918; 6,745,744; 6,536,405; 6,340,015; 6,073,607; 5,983,855; and 5,715,788. The contents of all of these patents are incorporated herein by reference.

Yet another way to enable rapid time response of ethanol injection is to use an expert system with a microprocessor having information about typical engine performance so as to anticipate the need for direct ethanol injection and to start such injection before it is needed. This use of an expert system compensates under some circumstances for the fuel-composition adjustment delay of the direct injection fuel delivery system.

Another particular transient of interest is during engine startup and engine shutdown. During engine startup, if it is desired to use the DI injector, it would be advantageous to use gasoline in the injector, minimizing the problems associated with cold start with the use of alcohol-based fuels. Irrespective of what is in the injector and the common rail (determined by conditions during shutdown), the fuel management system records the information of the fuel composition for use determining the conditions during the next start-up, be it a cold startup or a warm restart. The fuel composition information is used to control injection timing, air/fuel composition, spark timing. It is likely that in most cases the engine is operating under conditions of gasoline in the injector, as is most likely that for a considerable period prior to engine shutdown the engine is operating at low torque and thus injecting only gasoline. If not, once the engine shutdown mode is started, the engine could flush the fuel downstream from the proportioning valve to introduce gasoline into the region in preparation to the engine next start-up.

It is recognized that modifications and variations of the invention disclosed herein will be apparent to those of ordinary skill and the art. It is intended that all such modifications and variations be included with the scope of the appended claims.

What is claimed is:

1. Engine management system for operation of a direct injection spark ignition gasoline engine comprising:
   a gasoline engine;
   a source of gasoline;
   a source of anti-knock agent;
   a first low pressure pump for pumping gasoline for the source of gasoline;
   a second low pressure pump for pumping anti-knock agent from the source of anti-knock agent;
   a high pressure pump;
   a proportioning valve for receiving gasoline and anti-knock agent from the first and second low pressure pumps and delivering a selected mixture of gasoline/anti-knock agent to the high pressure pump;
   at least one injector for receiving the selected mixture from the high pressure pump and directly delivering the liquid mixture into a cylinder of the engine where the ratio of the anti-knock agent to gasoline is sufficient to prevent knock as the torque is increased and where the volume between the high pressure pump and the fuel injectors is minimized to improve transient performance; and
   wherein when demand exists for direct injection of the antiknock agent, the direct injector first injects mainly the anti-knock agent from a fuel rail/injector that has been primed from the source of anti-knock agent and, over a longer period of time, co-injects gasoline so as to minimize anti-knock agent use, while also providing a fast response in the injection of the anti-knock agent.

2. The system of claim 1 where spark retard is used to reduce the anti-knock agent/gasoline ratio that is needed to prevent knock and where the amount of spark retard varies during the operating time.

3. The system of claims 1 or 2 further including operating during the fuel-composition adjustment delay period under conditions away from stoichiometry, either with fuel rich or with fuel lean conditions.

4. The system of claims 1 or 2 where in addition to spark retard the engine is operated away from stoichiometry, with either rich or lean mixtures.

5. The system of claim 1 wherein the injector is corrosion resistant.

6. The system of claim 1 further including port fuel injection of gasoline from the source of gasoline during part of the engine operation time.

7. The system of claim 6 wherein the direct injector system is primed with the anti-knock agent when only port fuel injected gasoline is being used and the antiknock fuel is not being used, in order to have it ready for injection once the engine control system demands it.

8. The system of claim 7 where when the anti-knock agent is needed, the direct injector initially injects substantially only the anti-knock agent.

9. Engine management system for operation of a direct injection spark ignition gasoline engine comprising:
   a gasoline engine;
   a source of gasoline;
   a source of anti-knock agent;

a first low pressure pump for pumping gasoline for the source of gasoline;

a second low pressure pump for pumping anti-knock agent from the source of anti-knock agent;

a high pressure pump;

a proportioning valve for receiving gasoline and anti-knock agent from the first and second low pressure pumps and delivering a selected mixture of gasoline/anti-knock agent to the high pressure pump;

at least one injector for receiving the selected mixture from the high pressure pump and directly delivering the liquid mixture into a cylinder of the engine where the ratio of the anti-knock agent to gasoline is sufficient to prevent knock as the torque is increased and where the volume between the high pressure pump and the fuel injectors is minimized to improve transient performance; and an expert system to anticipate the need for direct injection to prevent knock and wherein the direct injection is started ahead of time to compensate for a lag time in the direct injection fuel delivery system.

10. The system of claims 1 or 9 wherein total fuel introduced into a cylinder is partially determined by the pressure of operation of the high pressure pump.

11. The system of claims 1 or 9 that can operate either only on gasoline or on the anti-knock agent if the other fuel has been exhausted or is close to exhaustion.

12. The system of claim 1 or 9 wherein the anti-knock agent does not contain lubrication additives.

13. The system of claim 1 wherein when the need for direct injection of the fuel is terminated and the engine operates exclusively with port fuel injected gasoline, the direct fuel injection system is primed with the antiknock agent from the source of the antiknock agent.

14. The system of claim 1 or 9 wherein the direct injector injects either gasoline, the anti-knock agent or a mix of gasoline and the anti-knock agent during substantially all of the time that the engine is operating.

15. The fuel management system of claims 1 or 9 where the fuel management flushes the fuel injection system downstream from the proportioning valve after initiation of engine shutdown, and introduces gasoline into this region in preparation for engine start-up from either cold conditions or warm conditions.

16. The system of claims 1 or 9 wherein total fuel introduced into a cylinder is determined by pulse width modulation of the injector.

17. The system of claim 9 where spark retard is used to reduce the anti-knock agent/gasoline ratio that is needed to prevent knock and where the amount of spark retard varies during the operating time.

18. The system of claims 9 or 17 further including operating during the fuel-composition adjustment delay period under conditions away from stoichiometry, either with fuel rich or with fuel lean conditions.

19. The system of claims 9 or 17 where in addition to spark retard the engine is operated away from stoichiometry, with either rich or lean mixtures.

20. The system of claim 9 wherein the injector is corrosion resistant.

21. The system of claim 9 further including port fuel injection of gasoline from the source of gasoline during part of the engine operation time.

22. The system of claim 21 wherein the direct injector system is primed with the anti-knock agent when only port fuel injected gasoline is being used and the antiknock fuel is not being used, in order to have it ready for injection once the engine control system demands it.

23. The system of claim 22 where when the anti-knock agent is needed, the direct injector initially injects substantially only the anti-knock agent.

24. The system of claim 1 or 9 wherein the high pressure pump and proportioning valve form a single unit.

25. The system of claim 1 or 9 wherein the high pressure pump is cooled by either gasoline, the antiknock agent or both, and the heated fluid or fluids are returned separately to their respective tanks upstream from the proportional valve in the combined high pressure pump/proportional valve.

26. The system of claim 1 or 9 further including an expert system having a microprocessor to anticipate a need for direct injection of the anti-knock agent when the system also operates with PFI injector of gasoline.

27. The system of claim 1 or 9 further including pulsed pressure air assisted injection.

28. The system of claims 3, 4, 18 or 19 wherein the amount of fuel or air enrichment is determined from the known composition of the anti-knock agent/gasoline fraction in the fuel line, and the amount of turbocharging and torque are adjusted to prevent knock and are lower than desired by the operator until an adequate anti-knock fraction/gasoline fraction is reached.

29. The fuel management system of claims 1 or 9 wherein the injector is integrated with a spark plug.

30. The fuel management system of claims 2, 3, 17 or 18, wherein some of the cylinders operate in fuel rich conditions to avoid knock, while the rest operate on fuel lean conditions to also avoid knock.

31. The fuel management system of claim 30 wherein a three way catalyst is used and at the catalyst the average air/fuel ratio is close to stoichiometric.

32. The fuel management system of claim 30 where a given cylinder operates rich during a portion of the fuel composition adjustment delay, and lean during a different portion of the fuel composition adjustment delay.

33. The fuel management system of claims 1 or 9 where the fuel management system records information on the fuel composition in the injection system during engine shutdown, and uses that information for the engine startup from either cold conditions or warm conditions.

* * * * *